United States Patent [19]

Danielsson

[11] 4,184,723
[45] Jan. 22, 1980

[54] ROTATABLE ROLLER ARRANGEMENT

[75] Inventor: Kurt L. Danielsson, Smedjebacken, Sweden

[73] Assignee: Morgardshammar Aktiebolag, Smedjebacken, Sweden

[21] Appl. No.: 901,831

[22] Filed: May 1, 1978

[30] Foreign Application Priority Data

May 13, 1977 [SE] Sweden ................................ 7705627

[51] Int. Cl.² ...................... F16C 33/00; F16C 25/00; B21B 13/02
[52] U.S. Cl. ................................ 308/190; 29/116 R; 308/20; 308/189 A
[58] Field of Search ...................... 308/20, 92, 93, 101, 308/189 R, 189 A, 190, 191; 193/37; 29/116 R

[56] References Cited

U.S. PATENT DOCUMENTS

| 3,516,717 | 6/1970 | Peterson | 308/189 A |
| 3,890,020 | 6/1975 | Thomas | 308/191 |

FOREIGN PATENT DOCUMENTS

| 1425953 | 3/1969 | Fed. Rep. of Germany | 308/191 |
| 657559 | 9/1951 | United Kingdom | 29/116 R |
| 233492 | 6/1969 | U.S.S.R. | 29/116 R |

Primary Examiner—Charles E. Frankfort
Attorney, Agent, or Firm—Young & Thompson

[57] ABSTRACT

A rotatable roller arrangement is described, especially for rapidly-rotating rollers intended for abutment pressure such as roller guide rollers in rolling mills, which is rotatably journalled on a stationary shaft by means of at least two ball bearings situated symmetrically inside the roller on both sides of a shoulder arranged inside said roller. The shoulder, defining the axial positions of the bearings in the roller, has the shape of a ring which is held in a cylindrical bore for the same and the bearings pass through the roller, said bore surrounding the shaft. The outer and inner rings of the bearings are movable in the cylindrical bore of the roller and on the shaft, respectively, and are axially urged away from the shoulder-forming ring inside the roller.

3 Claims, 2 Drawing Figures

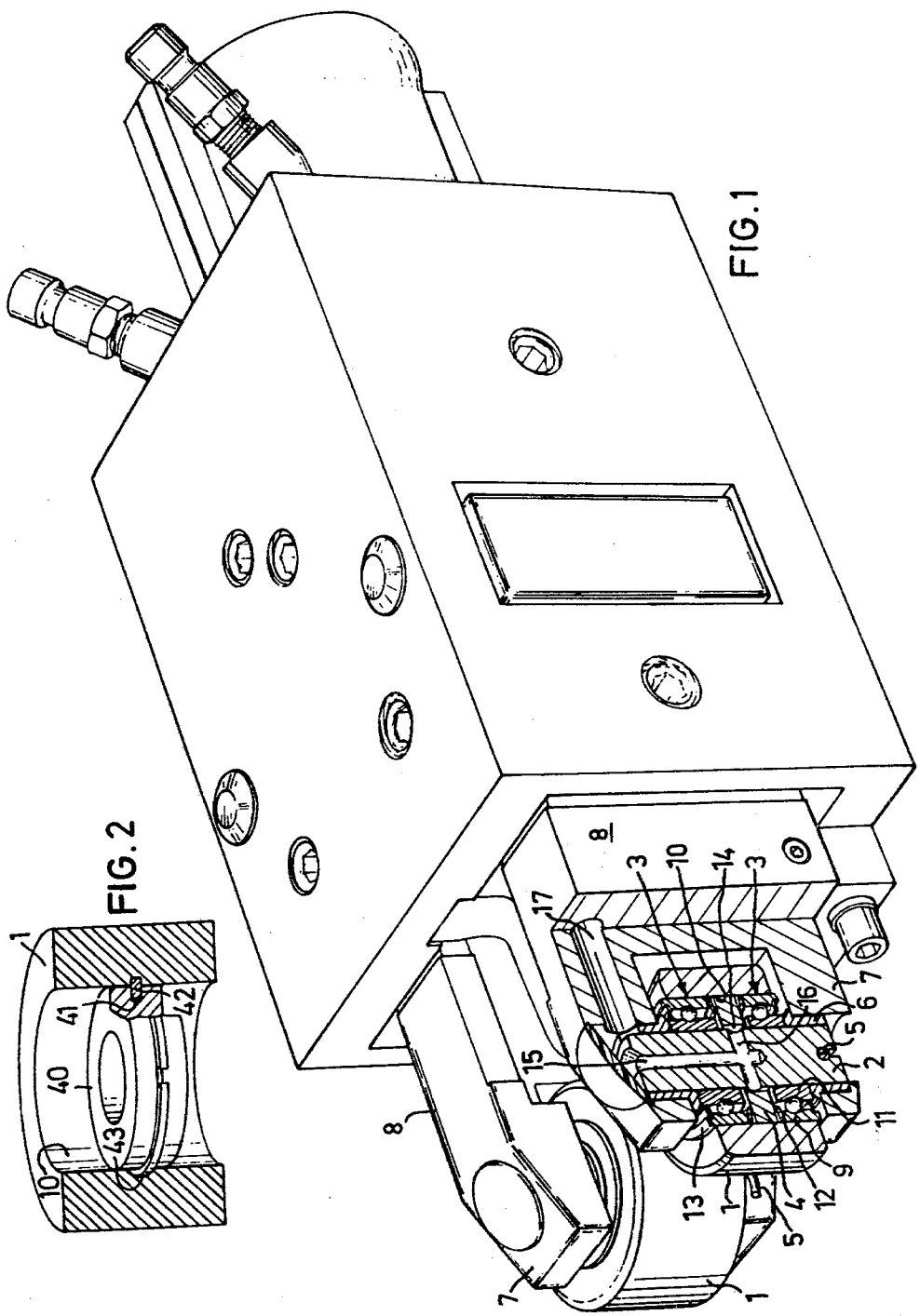

ROTATABLE ROLLER ARRANGEMENT

The present invention relates to an arrangement for a rotatable roller which is journalled on a stationary shaft by means of at least two ball bearings which are situated symmetrically inside the roller on both sides of a shoulder situated inside said roller, said shoulder defining the axial position of the bearings in the roller.

In such rollers, which are put to a great number of uses, arrangement of the bearing positions and the inner shoulder on both sides of which said ball bearings are situated has required three machining operations, namely boring a hole through the roller and boring each of the two bearing positions, between which latter two boring operations the roller has had to be turned over.

Beyond the fact that the three machining operations with intermediate turning over of the roller have entailed detailed and unnecessarily time-consuming manufacture, the known procedure for achieving the bearing positions and shoulder has also been found to entail that the concentricity between the two bearing positions has not always met with the demands which must be made on contact pressure-loaded rapidly rotatable rollers such as, for example, roller guide rollers in rolling mills. By virtue of their being subjected to considerable contact pressure and rapid rotation (30,000-35,000 rpm in modern thread rolling mills) and very rapid accelerations repeated at excessively short intervals, such rollers become especially sensitive as regards their correct bearing positions. Even slight deviations in concentricity between the two bearings give rise to both a tendency of the rollers to lag and great reductions in lifetime as a result of bearing wear.

Thus, the purpose of the invention is to provide a rotatable roller arrangement of the kind disclosed in the introduction, said arrangement being free from the disadvantages described above and inherent in the known rotatable rollers. The invention has the special purpose of providing a device which can be used in connection with rollers which rotate both slowly and rapidly on a stationary shaft.

An arrangement constructed according to the invention which serves said purpose and which in practical tests has even revealed itself to be capable of doing so in connection with roller guide rollers in rolling mills is primarily characterized in that the shoulder situated inside the roller has the shape of a ring which is held in a cylindrical borehole common to the shoulder and the bearings and passing completely through the roller, said borehole surrounding the shaft, the outer and inner rings of the bearings being movable in the cylindrical borehole of the roller and on the shaft, respectively, said bearings being axially urged away from the shoulder-forming ring inside the roller. By means of the shoulder according to the invention having the shape of a ring, the need for the three machining operations and the intermediate turning over of the roller is eliminated simultaneously as an exact concentricity between the bearing positions is achieved as they will be situated within different sections of one and the same cylindrical borehole passing through the roller. The shoulder can either be retained in the borehole by means of a radial force fit or by means of a locking ring which fits into an annular groove around the periphery of the shoulder and in an annular groove around the periphery of the borehole.

In order to obtain a suitable axial preloading of the bearings in a simple and uncomplicated manner at the same time as one obtains an elastic resiliency of said preloading which is advantageous for the function of the roller, resilient members in, for example, the form of cup springs can, in an advantageous embodiment of the arrangement according to the invention, be arranged between the side surfaces of the shoulder-forming ring and the outer rings of the bearings in the axial direction of the roller, while the inner rings of the bearings are in axial pressure-exerting contact with the attachment means for the ends of the shaft projecting outside of the roller, for example bushings or the like surrounding the ends of the shaft.

By virtue of the ring intended to be a shoulder inside the roller having dimensions which fit best in different connections, the ring can also be used for purposes other than merely constituting a shoulder for the bearings. In an especially advantageous embodiment, for example, the inner surface of the ring forms a wall in a lubricating channel for the bearings.

In order to secure good bearing lubrication in an arrangement according to the invention without using any complicated auxiliary means for the construction of the same, the lubricating channel to the bearings can also comprise parts situated inside the shaft. In an especially advantageous embodiment, the lubricating channel parts situated inside the shaft extend axially and diametrically in the shaft, the outlet openings of the diametrical part(s) being directed towards the inner surface of the ring which forms the lubricating channel wall, said surface forming a lubricating agent flow distributor. By virtue of the lubricating agent striking the inner surface of the ring when it flows out of the diametrical channel parts, it shall flow out in all directions on the same and be thereby distributed on the bearings situated on both sides of the ring.

The invention shall be described in more detail below, reference being made to an embodiment of an arrangement constructed according to said invention and shown in the accompanying drawing.

FIG. 1 of the drawing is a perspective view of a roller guide in rolling mills whose roller guide rollers are, as is revealed by the axial section through one of the two rollers, provided with an arrangement according to the invention.

FIG. 2 is an example of how an annular shoulder included in such an arrangement can be maintained in a cylindrical borehole by means of a locking ring.

The fact that the arrangement according to the invention has been exemplified only in its application in roller guide rollers does not, however, entail that it is restricted to said use. An arrangement according to the invention can be used in any rotatable roller which is rotatably journalled on a stationary shaft by means of at least two ball bearings which are situated symmetrically inside the roller on both sides of a shoulder situated inside said roller, said shoulder defining the axial position of the bearings in the roller. The fact that use in roller guide rollers has been selected as an example of the invention is due merely to the fact that the demands made on the rotatable rollers appearing in roller guides are much greater than the demands placed on rotatable rollers having other areas of use, and due to the fact that practical tests have shown that a device according to the invention is especially suitable in roller guide rollers and, thus, it is also suitable in most other kinds of rotatable rollers, where demands are lower.

The roller guide shown in FIG. 1 comprises two so-called roller guide rollers 1 which, for example, consist of cylindrical rollers which are rotatably journalled on a stationary shaft 2 by at least two ball bearings 3 which are situated symmetrically inside the roller on both sides of a shoulder 4 arranged inside said roller, said shoulder defining the axial position of the bearings 3 in the roller. The shaft 2 is fixed in bushings 6 by means of a cotter 5 or the like, said bushings being arranged in the proximity of the free ends of the two shanks 7 of a roller holder 8 in the roller guide, said roller holder being fork-shaped in a known manner.

According to the invention, the shoulder 4 has the shape of a ring; and in the shown example it has the shape of a cylindrical ring which is held in position by means of force fit in a cylindrical borehole 10 which is common for the same and the bearings 3, said borehole passing through the roller 1. This borehole surrounds both the bearings 3 as well as the ring forming the shoulder 4 and thereby also surrounds the stationary shaft 2. Such a shoulder 4 can, however, also be held in the borehole by means of a locking ring. FIG. 2 shows an example of the same. The shoulder 40 is held in the borehole 10 in the roller 1 by means of a locking ring 42 which grips into an annular groove 41 around the periphery of the shoulder and in an annular groove 43 around the periphery of the borehole.

The outer rings 9 of the bearings 3 are movable in the cylindrical borehole 10 by means of slide fitting, while their inner rings 11 are movable by means of light fitting on the shaft 2. By virtue of their being movable in the borehole 10 and on the shaft 2, the axial urging possibilities of the bearings 3 away from the shoulder-forming ring 4 becomes as intended by the invention.

In order to constitute the shoulder in the borehole 10 of the roller 1, the ring 4 is held in the same by means of said force fit, which appears to be most suitably obtained by means of the ring 4 being arranged with heavy force fit in the borehole.

The axial preloading with which the bearing outer rings 9 are urged in the borehole 10 away from the ring 4 and the bearing inner rings 11 are arranged on the shaft 2 can be achieved in different ways. However, in the embodiment shown here, it is achieved by means of a member which is resilient in the axial direction of the roller 1, for example, in the form of a cup spring 12 being arranged between the shoulder-forming ring 4 and each of the outer rings 9 of the bearings pressing against the same. At the same time, the inner rings 11 of the bearings are in axial pressure-providing contact with a radially-projecting flange portion on the bushings 6 so that the bushing flanges form abutments for the bearing inner rings 11. Covering plates 13 are arranged on the outer sides of the bearings 3 so as to prevent penetration of pollutants into the running areas of the bearings. These plates can advantageously consist of the protective plates which are usually used in a number of types of ball bearings where they are supported by the outer rings of the bearings.

Sleeve-shaped main parts of the bushings 6 are arranged in throughbores near the free ends of the shanks 7 of the roller holders 8. As the bushings 6, for easily-understood reasons, are arranged in the boreholes in the roller holder shanks 7 before the roller 1 and shaft 2 are applied, the radially-projecting flange portions of the sleeves can be provided with a bevelled outer edge on the side facing the bearings 3 in the roller. In this way, the guidance of the roller and the correct pressing of the bearings in the fork-shaped holders 8 is expedited. When the shaft 2 is thereafter inserted through the two bearings 3 in the rollers, the further advantage that both the bearing positions in the rollers and the correct bearing preloading in relation to the shoulder-forming ring 4 are secured as a result of abutment of the axial outer sides of the inner rings 11 of the bearings against the bushing flanges and the abutment of the outer bearing rings 9 against the cup springs 12 and the shoulder-forming ring 4.

By virtue of the inner diameter of the ring forming the shoulder 4 inside the throughbore 10 of the rollers 1 being able to be selected with comparatively great freedom, the inner surface of said ring can also be used as a wall in a lubricating channel 14 to the bearings 3 inside the roller. The lubricating agent which is required for the bearings can be advantageously supplied to said channel 14, which consists of the slot between the inner peripheral surface of the ring or shoulder 4 and the outer peripheral surface of the shaft 2, by means of further lubricating channel parts situated inside the shaft 2. In the embodiment shown here, the lubricating channel parts in the shaft consist of a bore 15 extending from one end of the shaft to the middle of the shaft and a diametrical throughbore 16 passing through the shaft and crossing the above-mentioned axial bore 15 near its inner end inside the shaft. By means of the outlet openings from the throughbore or lubricating channel part 16 extending diametrically in the shaft being directed towards the wall in the lubricating channel part 14 in the roller 1 which forms the inner peripheral surface of the shoulder or ring 4, said surface will form a flow distributor for the lubricating agent and lead the same to the lubricating positions of the bearings 3 situated symmetrically on both sides of said shoulder. The supply of lubricating agent to the axial channel part 15 in the shaft 2 can be carried out in any suitable manner, for example by means of a lubricating channel 17 in the roller holder 8 which is in communication with the axial channel part 15 in the shaft.

In the arrangement shown, the roller 1 is provided with an outer surface which is cylindrical. In other embodiments within the scope of the invention, however, said surface can also have another shape and, for example, be provided with one or more grooves having greatly varying shapes.

The invention is not restricted to the embodiment described above and in the drawing. Rather, it can be modified in many ways within the scope of the claims.

What I claim is:

1. Rotatable roller arrangement, comprising a fixed shaft, a pair of spaced fixed roller holders supporting the ends of the shaft, a rotatable roller having a cylindrical bore, said roller being rotatable on the shaft between the roller holders, an annular shoulder secured to the roller inside the bore between the ends of the roller, a bearing within the bore on each side of the shoulder, each bearing having an inner race slidable on the shaft and an outer race slidable on the interior of the bore, a pair of springs on opposite sides of the shoulder acting between the shoulder and the outer races of each bearing to urge said outer races away from the shoulder, and a bushing at each end of the fixed shaft, each bushing comprising a cylindrical sleeve disposed between one end of the shaft and one of said roller holders and a radially outwardly extending flange at one end of the sleeve and disposed between a said inner race and the same said roller holder.

2. Arrangement according to claim 1, each said spring comprising a cup spring.

3. Arrangement according to claim 1, each said radially extending flange having a beveled outer edge on the side facing the adjacent said bearing.

* * * * *